United States Patent
Pirk et al.

(10) Patent No.: US 9,608,307 B2
(45) Date of Patent: Mar. 28, 2017

(54) SEMICONDUCTOR SUBSTRATE-BASED SYSTEM FOR AN RFID DEVICE, RFID DEVICE, AND METHOD FOR MANUFACTURING SUCH A SEMICONDUCTOR SUBSTRATE-BASED SYSTEM

(75) Inventors: Tjalf Pirk, Stuttgart (DE); Andreas Krauss, Tuebingen (DE); Laura Bohne, Schorndorf (DE); Janpeter Wolff, Wurmberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 13/105,632

(22) Filed: May 11, 2011

(65) Prior Publication Data

US 2011/0278363 A1    Nov. 17, 2011

(30) Foreign Application Priority Data

May 11, 2010  (DE) .......................... 10 2010 028 868

(51) Int. Cl.
| | | |
|---|---|---|
| *G06K 19/06* | (2006.01) | |
| *H01Q 1/22* | (2006.01) | |
| *G06K 19/07* | (2006.01) | |
| *G06K 19/077* | (2006.01) | |
| *H01M 6/40* | (2006.01) | |

(52) U.S. Cl.
CPC ....... *H01Q 1/2283* (2013.01); *G06K 19/0702* (2013.01); *G06K 19/07749* (2013.01); *H01Q 1/2225* (2013.01); *H01M 6/40* (2013.01)

(58) Field of Classification Search
USPC .......................... 235/487, 492; 340/10, 572
See application file for complete search history.

(56) References Cited

U.S. PATENT DOCUMENTS

| | | | |
|---|---|---|---|
| 5,110,696 A | * | 5/1992 | Shokoohi ................ C23C 14/08 29/623.5 |
| 6,495,283 B1 | | 12/2002 | Yoon et al. |
| 7,649,463 B2 | | 1/2010 | Tuttle |
| 8,791,358 B1 | * | 7/2014 | Dutta ................ H01L 31/02021 136/252 |
| 2001/0002106 A1 | * | 5/2001 | Tuttle et al. .................. 324/754 |
| 2003/0231106 A1 | | 12/2003 | Shafer |
| 2004/0131897 A1 | | 7/2004 | Jenson et al. |
| 2005/0017571 A1 | * | 1/2005 | McCorry et al. ........ 301/64.101 |

(Continued)

FOREIGN PATENT DOCUMENTS

| | | |
|---|---|---|
| CN | 1757086 A | 4/2006 |
| CN | 101019137 A | 8/2007 |
| EP | 1628244 A1 | 2/2006 |

*Primary Examiner* — Michael G Lee
*Assistant Examiner* — Tabitha Chedekel
(74) *Attorney, Agent, or Firm* — Gerard Messina

(57) ABSTRACT

A semiconductor substrate-based system for an RFID device, in particular an RFID transponder, having a semiconductor substrate and an electronic circuit system which is structured on the semiconductor substrate is provided. The semiconductor substrate-based system also has a thin-layer battery, likewise structured on the semiconductor substrate, for supplying power to the RFID device. Moreover, an RFID device having a corresponding semiconductor substrate-based system, and a method for manufacturing a corresponding semiconductor substrate-based system are provided.

17 Claims, 1 Drawing Sheet

(56) References Cited

U.S. PATENT DOCUMENTS

| | | |
|---|---|---|
| 2006/0017571 A1* | 1/2006 | Arnold et al. ............. 340/572.7 |
| 2006/0032046 A1* | 2/2006 | Nathan et al. ............... 29/623.5 |
| 2008/0048835 A1* | 2/2008 | O'Toole ................ H03L 7/0995 340/10.4 |
| 2008/0129510 A1 | 6/2008 | Tuttle |
| 2008/0297350 A1 | 12/2008 | Iwasa et al. |

* cited by examiner

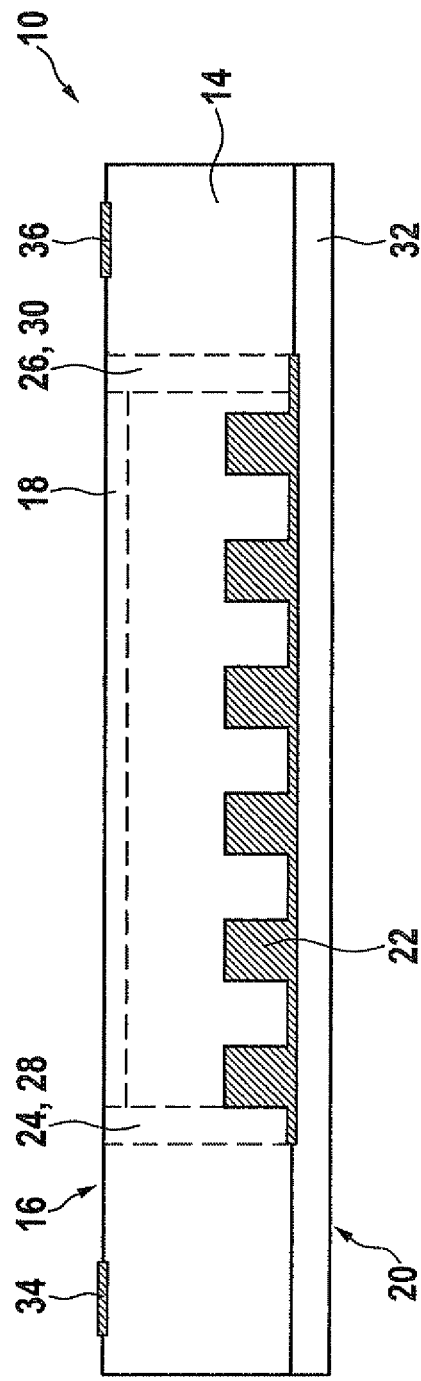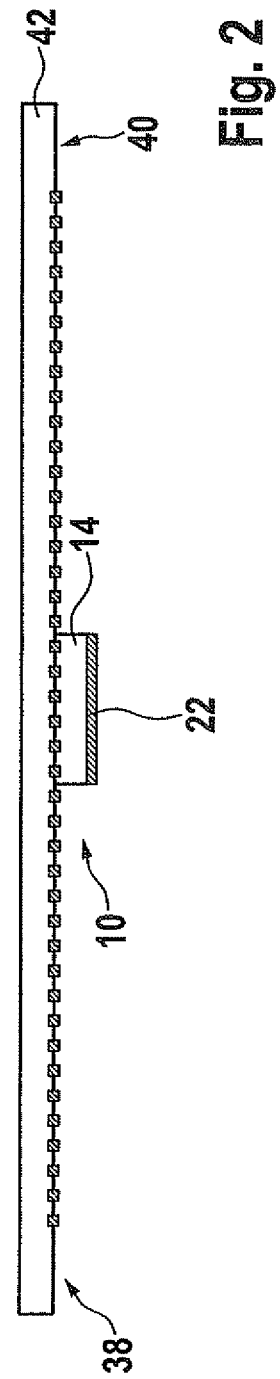

SEMICONDUCTOR SUBSTRATE-BASED SYSTEM FOR AN RFID DEVICE, RFID DEVICE, AND METHOD FOR MANUFACTURING SUCH A SEMICONDUCTOR SUBSTRATE-BASED SYSTEM

CROSS-REFERENCE TO RELATED APPLICATIONS

The present application claims priority to Application No. 10 2010 028 868.3, filed in the Federal Republic of Germany on May 11, 2010, which is expressly incorporated herein in its entirety by reference thereto.

FIELD OF THE INVENTION

The present invention relates to a semiconductor substrate-based system for an RFID device, in particular an RFID transponder, having a semiconductor substrate and an electronic circuit system which is structured on the semiconductor substrate.

BACKGROUND INFORMATION

Passive and active devices, i.e., transponders, are known in the field of radio frequency identification (RFID) technology. Passive devices are understood to mean systems which obtain the energy required for communication and for processing of internal processes solely from the field of an associated writing/reading unit. Thus, passive devices do not need their own power supply, but on the other hand are able to operate at only relatively short distances from the writing/reading unit. Active devices have their own power supply. Active devices either have an installed energy store or are connected to an external power supply system. As a result, not only are greater communication ranges possible, but also the management of larger data memories or the operation of an integrated sensor system is implementable. Batteries or capacitors, for example, are known as energy stores for active RFID devices.

These are additional components which, together with the semiconductor substrate-based system having the electronic circuit system for the RFID communication, are situated on a printed circuit board.

U.S. Patent Application Publication No. 2008/0129510 A1, now issued as U.S. Pat. No. 7,649,463, discloses such an RFID system. The semiconductor substrate-based system having the electronic circuit system structured on a semiconductor substrate as well as a film battery are situated on a shared substrate, and are connected to one another via conductive strips.

SUMMARY OF THE INVENTION

According to example embodiments of the present invention, a semiconductor substrate-based system having the features described herein offers the advantage that a compact RFID circuit unit is provided which reduces the extent of necessary external wiring for the semiconductor substrate-based system and the number of components of a corresponding RFID device. According to example embodiments of the present invention, for this purpose the semiconductor substrate-based system has a thin-layer battery, likewise structured on the semiconductor substrate, for supplying power to the RFID device. Since structuring measures for structuring the electronic circuit system on the semiconductor substrate are carried out, appropriate measures may also be used for mounting a thin-layer battery on the same semiconductor substrate. The semiconductor substrate-based system is thus an RFID chip having an integrated thin-layer battery. The semiconductor substrate is preferably a silicon substrate (Si substrate) or a gallium arsenide substrate (GaAs substrate).

Within the meaning of the present invention, an RFID device is understood to mean a device for identification with the aid of electromagnetic waves in the high-frequency range, the term "radio frequency" (RF) being used in general for high frequency and ultrahigh frequency, or specifically for the radio frequency band. A common frequency is 13.56 MHz, for example. This RFID device is in particular an RFID transponder. A transponder is a wireless communication device which receives incoming signals and automatically replies to or forwards them. The word "transponder" is a combination of the words "transmitter" and "responder," and therefore a transponder is a "response transmitter."

According to some advantageous example embodiments of the present invention, it is provided that the circuit system is situated on one side of the semiconductor substrate, and the thin-layer battery is situated on an opposite, other side of the semiconductor substrate. In this way, on the one hand optimal use is made of the substrate surface, and on the other hand an RFID chip is provided which is easily integratable into an RFID device.

According to further advantageous example embodiments of the present invention, it is provided that the thin-layer battery for supplying power to the RFID device is electrically connected to the circuit system via connecting structures which are likewise structured on the semiconductor substrate. Thus, no external circuitry for supplying power is necessary.

It is provided in particular that the connecting structures are designed as feedthroughs, or at least have feedthroughs. This embodiment of the connecting structures is particularly suited for a semiconductor substrate-based system in which the circuit system is situated on one side of the semiconductor substrate, and the thin-layer battery is situated on the opposite, other side of the semiconductor substrate.

Alternatively, it is preferably provided that the thin-layer battery for supplying power to the RFID device is electrically connected to the circuit system via wiring external to the substrate. This wiring is, for example, wiring produced using bonding technology, i.e., wiring having bonding wires.

In one preferred embodiment of the present invention, it is provided that the semiconductor substrate-based system has at least one antenna terminal contact for an antenna, in particular an RFID antenna, situated on the semiconductor substrate. The antenna terminal contact is designed in particular as a bond pad which is suitable for a so-called flip-chip installation.

In further preferred example embodiments of the present invention, it is provided that the thin-layer battery is designed as a three-dimensional thin-layer battery in which a high surface storage density is achieved by providing a structured substrate surface which is enlarged compared to a planar substrate surface.

Moreover, example embodiments of the present invention relate to an RFID device having a previously mentioned substrate system and an antenna. The RFID device is in particular an RFID transponder (RFID response transmitter). The RFID device according to the present invention thus has a particularly small number of components.

According to an advantageous refinement of the RFID device according to example embodiments of the present invention, it is provided that the antenna is connected to the semiconductor substrate-based system via a support which supports the antenna, an antenna contact of the antenna electrically contacting the antenna terminal contact. Further external wiring of the semiconductor substrate-based system (the RFID chip) may be dispensed with. It is provided in particular that the support has an adhesion-capable or self-adhesive design. An adhesive label is an example of such a self-adhesive support.

Moreover, example embodiments of the present invention relate to a method for manufacturing a semiconductor substrate-based system for an RFID device, having the following steps: (a) structuring an electronic circuit system for the RFID device on a semiconductor substrate, (b) structuring a thin-layer battery for supplying power to the RFID device on the same semiconductor substrate, and (c) connecting the thin-layer battery to the circuit system. The sequence of carrying out the steps may be varied, or may partially or completely overlap, depending on the design of the system. The RFID device is in particular a previously mentioned RFID device, preferably an RFID transponder. It is provided in particular that the circuit system is structured on one side of the semiconductor substrate, and the thin-layer battery is structured on an opposite side of the semiconductor substrate.

It should be understood that the features mentioned above and those yet to be explained below may be used not only in the particular combination given but also in other combinations or alone.

Example embodiments of the present invention are illustrated schematically in the Figures and are described below in more detail with reference to the Figures.

BRIEF DESCRIPTION OF THE DRAWINGS

FIG. 1 is a schematic illustration of a semiconductor substrate-based system, designed as an RFID chip, for an RFID device according to one preferred exemplary embodiment.

FIG. 2 shows an RFID device composed of the semiconductor substrate-based system illustrated in FIG. 1 and an antenna situated on a support.

DETAILED DESCRIPTION

Figure 1 shows a semiconductor substrate-based system 10, designed as a radio frequency identification (RFID) chip, for an RFID device 12 shown in FIG. 2. Semiconductor substrate-based system 10 has a semiconductor substrate 14 designed as a silicon substrate, an electronic circuit system 18 (integrated circuit (IC)) structured on one side 16 (in the illustration in FIG. 1, the top side) of semiconductor substrate 14 using conventional processes, and a thin-layer battery 22 structured on side 20 (in the illustration in FIG. 1, the bottom side) situated opposite from the one side 16. Thin-layer battery 22 is designed as a three-dimensional thin-layer battery in order to increase the surface thereof with respect to the substrate extension of semiconductor substrate 14 while occupying the same amount of space. For electrically connecting thin-layer battery 22 to circuit system 18, system 18 has connecting structures 24, 26, likewise structured on and/or in semiconductor substrate 14, which in system 10 shown in FIG. 1 are designed as feedthroughs (vias) 28, 30. Thin-layer battery 22 is encapsulated by an encapsulating layer 32 which completely covers battery 22 and thus protects against environmental influences.

Antenna terminal contacts 34, 36 for contacting an antenna 38 shown in FIG. 2, and which are electrically connected to circuit system 18, are also situated on the one side 16 of substrate 14, i.e., system 10.

Figure 2 shows RFID device 12, which is designed as an RFID transponder. Antenna 38 is structured on one side 40, which is provided with adhesive or a connecting layer, of a support 42 which is designed as an adhesive support, and on this side 40 of support 42 is also connected to semiconductor substrate-based system 10, antenna contacts (not shown) of antenna 38 electrically contacting antenna terminal contacts 16, 18 of system 10. Corresponding RFID device 12 may thus be adhered to an object which is to be identified with the aid of high-frequency radiation.

Thin-layer battery 22 takes over the energy storage function for semiconductor substrate-based system 10 (the RFID chip), and in addition to the known functions of RFID device 12 also allows new functions, for example a temporal separation between query and response, in particular a delayed response for avoiding collisions, a separation of functions at various frequencies, for example energy recovery and battery charging at a "charge" frequency and RF communication at a different "detection" frequency. it is also possible to combine "programming" (for example, applying a serial number or state of a product provided with the RFID device) at one frequency, and mere readout at another frequency.

Such an RFID device is preferably manufactured in such a way that the circuit system, for example an RFID application-specific integrated circuit (RFID ASIC) or a microcontroller, is initially provided on the one side 16 of semiconductor substrate 14, using a known semiconductor processing method. Surface structuring, structuring of electrodes and electrolytes of thin-layer battery 22 on the structured surface, and encapsulation, as well as establishing a connection between thin-layer battery 22 and circuit system 18, are subsequently carried out on opposite side 20. Since circuit system 18 occupies only a very thin layer on the one side 16 of the semiconductor substrate-based system 10 (the semiconductor chip), use may be made of the majority of the semiconductor substrate 14 for producing deep structures which provide a very large surface for three-dimensional thin-layer battery 22.

The present invention allows the simplified structuring of an RFID device. The number of components is minimized, and in particular an additional external battery or a capacitor is dispensed with; in the ideal case, such an active transmission-capable RFID device is composed of only two components, antenna 38 and semiconductor substrate-based system 10 designed as an RFID chip and having integrated thin-layer battery 22, without an additional printed circuit board, capacitor, or other components. This results in increased reliability as the result of partially or completely dispensing with a printed circuit board and/or wiring. Protection against copying and counterfeiting is also increased, since inadvertent or intentional manipulations (for example, a temporary power interruption, or so-called brownout) via a voltage connection of an RFID chip are not possible.

Therefore, important applications may include the following: encrypted communication, for example for authenticity protection, completeness checking for installed components ("Are all components installed and present in the final product at the end of a production line?"), active production monitoring, "electronic control slips" or electronic charge cards (with recording of all process steps carried out during a production run), etc.

What is claimed is:

1. A semiconductor substrate-based system for an RFID device, the system comprising:
   a semiconductor substrate;
   an electronic circuit system integrated directly with the semiconductor substrate and without an additional printed circuit board; and
   a thin-layer battery integrated directly with the semiconductor substrate and configured to supply power to the RFID device and without an additional printed circuit board,
   wherein the thin-layer battery is a three-dimensional thin-layer battery in which a high surface storage density is achieved by providing a structured substrate surface which is enlarged compared to a planar substrate surface.

2. The system as recited in claim 1, wherein:
   the circuit system is situated on a first side of the semiconductor substrate; and
   the thin-layer battery is situated on an opposite, second side of the semiconductor substrate.

3. The system as recited in claim 1, wherein the thin-layer battery configured to supply power to the RFID device is electrically connected to the circuit system via connecting structures integrated with the semiconductor substrate.

4. The system as recited in claim 3, wherein the connecting structures are feedthroughs.

5. The system as recited in claim 3, wherein the connecting structures include feedthroughs.

6. The system as recited in claim 1, wherein the thin-layer battery configured to supply power to the RFID device is electrically connected to the circuit system via wiring external to the substrate.

7. The system as recited in claim 2, wherein the thin-layer battery configured to supply power to the RFID device is electrically connected to the circuit system via wiring external to the substrate.

8. The system as recited in claim 1, further comprising at least one antenna terminal contact for an antenna situated on the semiconductor substrate.

9. The system as recited in claim 1, wherein the RFID device is an RFID transponder.

10. An RFID device comprising:
    a semiconductor substrate-based system as recited in claim 1; and
    an antenna.

11. The RFID device as recited in claim 10, wherein:
    the antenna is connected to the semiconductor substrate-based system via a support which supports the antenna; and
    an antenna contact of the antenna electrically contacts the antenna terminal contact.

12. The RFID device as recited in claim 11, wherein the support is adhesion-capable or self-adhesive.

13. The RFID device as recited in claim 10, wherein the RFID device is an RFID transponder.

14. The system as recited in claim 1, wherein the thin-layer battery is entirely within the semiconductor substrate.

15. The system as recited in claim 1, further comprising an encapsulating layer completely covering and protecting at least one side of the semiconductor substrate against environmental influences.

16. A method for manufacturing a semiconductor substrate-based system for an RFID device, comprising:
    directly integrating an electronic circuit system for the RFID device with a semiconductor substrate and without an additional printed circuit board;
    directly integrating a thin-layer battery configured to supply power to the RFID device with the same semiconductor substrate and without an additional printed circuit board,
    wherein the thin-layer battery is a three-dimensional thin-layer battery in which a high surface storage density is achieved by providing a structured substrate surface which is enlarged compared to a planar substrate surface; and
    connecting the thin-layer battery to the circuit system.

17. The method as recited in claim 16, wherein the RFID device is an RFID transponder.

* * * * *